United States Patent [19]
Ernst

[11] 4,383,720
[45] May 17, 1983

[54] CENTRIFUGAL FLUID SEAL

[76] Inventor: Hermann H. F. Ernst, R.R. 2, St. Cloud, Minn. 56301

[21] Appl. No.: 343,999

[22] Filed: Jan. 29, 1982

[51] Int. Cl.³ .......................... F16C 33/76; F16J 15/42
[52] U.S. Cl. .............................. 308/187.1; 277/14 R; 277/15; 277/135
[58] Field of Search ................... 308/36.1, 36.2, 36.3, 308/36.4, 187.1, 187.2; 277/13, 14 R, 14 V, 25, 135, 53, 3, 15, 82, 92

[56] References Cited

U.S. PATENT DOCUMENTS

| | | | |
|---|---|---|---|
| 1,986,621 | 1/1935 | Bott | 277/82 X |
| 2,823,052 | 2/1958 | Collman | 277/15 X |
| 2,960,356 | 11/1960 | Tyce et al. | 277/25 X |
| 3,455,561 | 7/1969 | Rinker et al. | 277/13 |
| 3,765,688 | 10/1973 | Junker | 277/14 R |

Primary Examiner—Stuart S. Levy
Assistant Examiner—David Werner
Attorney, Agent, or Firm—Hill, Van Santen, Steadman, Chiara & Simpson

[57] ABSTRACT

A centrifugal fluid seal includes a rotatable hollow rotor formed by an annular cup enclosed by an annular cover having drain holes near its periphery. A stationary annular cap and recirculator jointly define an annular cavity in which the fluid to be sealed is centrifuged outwardly. At the outer limits of such cavity, the recirculator is apertured and receives high pressure fluid which rotates within the hollow recirculator and which is discharged radially inwardly just upstream of the cavity, against the rotor. The stationary annular cap also supports diverting means within the rotor, while the rotor supports annular conducting means for centrifuging any leakage fluid. In one embodiment, the rotor has a centrifugally responsive static seal that ensures sealing and engages the stationary annular cap in the absence of rotation, but automatically disengages from frictional contact with the stationary annular cap during dynamic seal operation.

22 Claims, 5 Drawing Figures

CENTRIFUGAL FLUID SEAL

BACKGROUND OF THE INVENTION

Field of the Invention

This invention relates to a centrifugal fluid seal, and more specifically to one that is capable of accommodating high relative rotational speeds between a shaft and a housing.

SUMMARY OF THE INVENTION

The present invention is directed to a centrifugal fluid seal of a non-leaking type. Certain uses or applications necessitate the automatic supply of a sealing or cooling fluid from the peripheral region of such a seal to a radially inward located cavity in order to provide sealing fluid circulation, to provide automatic sealing for higher pressure differentials, to provide cooling of the sealing fluid and to provide lubrication of adjacent bearings, and possibly other tasks. To this end, a static recirculator is used as part of a novel seal, and the recirculator is insensitive to any cavitation, even at extremely high operating speeds.

Accordingly, it is an object of the present invention to provide a centrifugal fluid seal that has a static recirculator for the fluid that is being sealed.

A further object of the present invention is to provide a centrifugal fluid seal wherein the rotating parts are out of contact with the stationary parts, thereby eliminating frictional, wear-prone contact between the stator and the rotor elements during dynamic operation, thereby assuring extremely long dynamic seal life.

Yet another object of the present invention is to provide a centrifugal fluid seal that employs an elastomeric seal which, under static conditions, bridges the gap between the spaced rotatable and stationary parts and seals at zero speed, but which during rotation under the influence of centrifugal force moves out of engagement with the stationary portion of the seal assembly.

Many other advantages, features and additional objects of the present invention will become manifest to those versed in the art upon making reference to the detailed description and the accompanying sheet of drawings in which preferred structural embodiments incorporating the principles of the present invention are shown by way of illustrative example.

On the drawing

Figure 1:
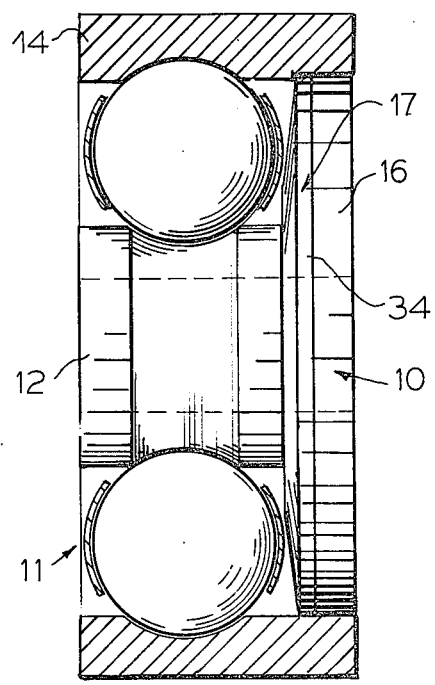
FIG. 1 is an elevational view of a centrifugal fluid seal shown in association with a bearing assembly, and provided in accordance with the principles of the present invention.

The principles of the present invention are particularly useful when embodied in a centrifugal fluid seal 10 shown mounted as part of a bearing assembly 11. The bearing assembly 11 includes a rotatable inner race 12 receptive of a shaft 13 (shown in FIG. 2) and an outer race 14 which is stationary and which is typically supported by a housing 15 (FIG. 3).

Figure 2:
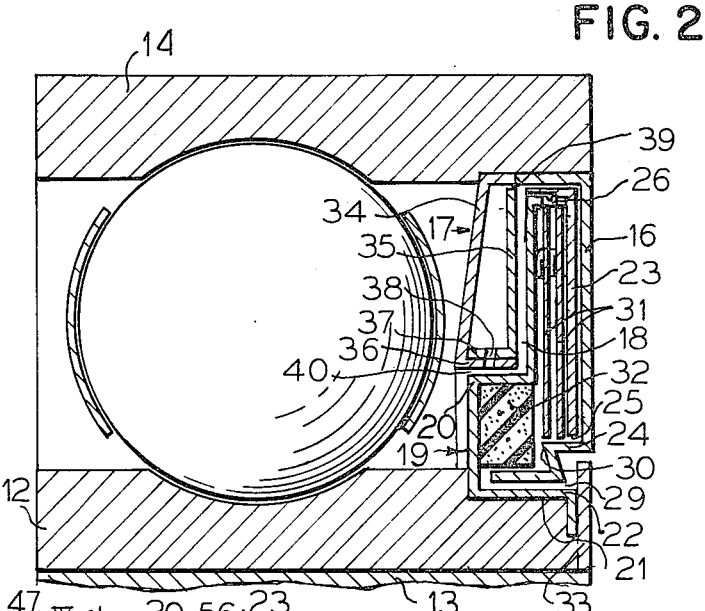
FIG. 2 is an enlarged cross-sectional view taken radially through the seal of FIG. 1.
Figure 3:
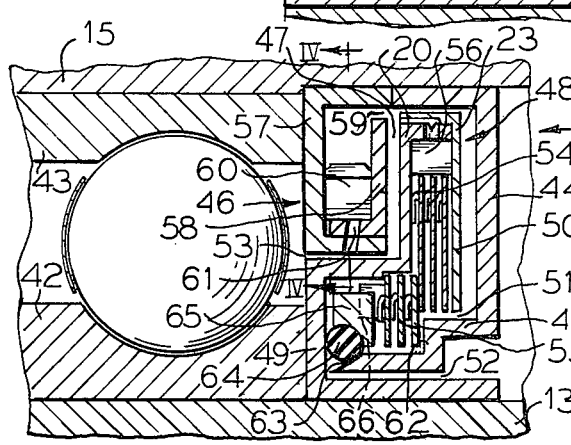
FIG. 3 is a cross-sectional view taken radially through a modified seal.

As best shown in FIG. 2, the seal 10 includes a stationary or fixed annular cap 16 and a static annular recirculator 17 which jointly define an annular cavity 18 therebetween. Within the cavity 18 there is disposed a hollow rotor 19. The hollow rotor 19 includes an annular cup 20 which has an axial opening 21 defined by a cylindrical portion 22 which is in fluid-tight relation with the inner race 12. The rotor 19 further includes an annular cover 23 secured to the outer periphery of the annular cup 20, such as with a press fit.

The annular cap 16 has a cylindrical portion 24 which extends through the opening in the rotor cover 23 into the annular cup 20, and thereby into the interior of the rotor 19. The inside diameter or periphery of the rotor cover 23, and the outside diameter or periphery of the cylindrical portion 24 of the annular cap 16 jointly define therebetween an annular gap 25 which communicates the cavity 18 with the interior of the rotor 19.

A number of drain holes 26 are provided near the largest internal diameter of the hollow rotor 19.

Figure 5:
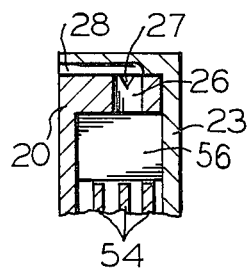
FIG. 5 is an enlarged fragmentary detail applicable to both the embodiments of FIG. 2 and FIG. 3.

While FIG. 5 is actually an enlarged portion of FIG. 3, the drain-hole structure thereof is identical to that shown in FIG. 2. To that end, there is provided a large number of individual radial holes 26 that extend through the outer periphery of the annular cup 20 and which are closed at their outer ends by the peripheral portion of the annular cover 23. A groove 27 extends around the outer periphery of the annular cup 20 and interconnects the individual holes 26. A relatively small number of blind bores 28 are in the rotor and could be in either component thereof, but are here shown to be in the cover 23. The blind bores 28 communicate the groove 27 with the cavity 18 adjacent to the recirculator 17. In one embodiment, forty radial holes 26 were used, equally spaced, while only three bores 28 were utilized. These quantities are not critical and illustrate an example of a relatively large quantity and a relatively small quantity of holes and bores. However, the principle involved is that their resultant outflow area is related to the flow area of the annular gap 25.

The inner periphery of the cylindrical portion 24 of the annular cap 16 and the outer periphery of the cylindrical portion 22 of the annular cup 20 jointly define a second annular gap 29 that communicates the lower pressure space at the outside of the fixed annular cap 16 with the interior of the rotor 19. The annular cap 16, on its cylindrical portion 24 has a diverting means 30 in the form of an annular step or shoulder within the rotor 19 downstream of the gap 25. The step or shoulder 30 is disposed radially inwardly out of possible contact with any accumulation of fluid that might occur upstream of the drain holes 26. The step or shoulder 30 has a diameter which is smaller than the first-mentioned annular gap 25 and which is greater than the second annular gap 29.

Within the rotor 19 there are two types of conducting means shown in this disclosure, one type being a pair of annular laminations 31 which are axially spaced from each other by means of spacing tabs, slight angular bends, or the like. The outer peripheries of the laminations 31 are engageable with the interior of the rotor 19 at its largest internal diameter, while the inner peripheries of the annular laminations 31 are sized substantially to be the same as that of the annular gap 25 which extends therethrough. A further form of conducting means constitutes an annular quantity of unified porous material 32. Examples of the unified porous material include rigid plastic foam, urethane sponge, felt, a wire mesh or screen, or a porous metal. Such conducting means is analogous to the laminations 31 in that such material provides increased surface areas within the rotor on which fluid can engage to receive centrifugal force to supplement that which the rotor can provide by itself.

If desired, a combined retainer and slinger disk 33 may be utilized to ensure corotation between the rotor 19 and the inner race 12, and also to prevent dust, debris, or other solid or liquid contaminants from entering the seal at the annular gap 29 from the outside lower pressure space. The static annular recirculator 17 includes an annular cup 34 supported at its outer periphery and in engagement with the outer periphery of the annular cap 16. The annular cup 34 is closed by an annular cap 35 supported at its inner periphery by the cup 34. To that end, the cup 34 has a cylindrical portion 36 and the annular cap 35 has a cylindrical portion 37 secured together as by a press fit. A number, for example 6, of sets of aligned fluid discharge apertures 38, evenly spaced about the rotational axis, are directed from the interior of the recirculator 17 in a radially inward direction toward the inner race 12. In that the cup 34, backed up by a shoulder on the outer race 14, provides a stop for the inward positioning of the annular cap 16, the annular cap 35 and the annular cap 16 jointly define the axial extent of the cavity 18. The recirculator 17 is further apertured at the largest diameter of the cavity 18, the aperture in this embodiment being in the form of a continuous gap 39.

In operation, the liquid to be sealed enters a third annular gap 40, and from there it passes into the cavity 18. The liquid which engages and wets the outside of the rotor 19 will be subjected to centrifugal force, the magnitude of which increases as the square of the distance from the rotational axis. Maximum fluid pressure will thus be present at the outer periphery of the rotor. In spite of that force, some liquid will creep along the interior stationary wall of the annular cap 16 while the opposite or adjacent surface of the rotor 19 applied centrifugal force to cause a radially outwardly directed centrifugal flow of the liquid. Nevertheless, a small quantity of the liquid will follow the stationary surface of the annular cap 16 and enter the annular gap 25. There it is picked up by the interior surface of the rotor and centrifuged radially outwardly. This internal action of the rotor is assisted by the presence of the conducting means or laminations 31. In order to minimize creepage of liquid along the cylindrical portion 24, the diverting means or annular step 30 provide a discontinuity that greatly lessens any such axial flow within the hollow rotor. However, the further conducting means 32 functionally seals off any trace of leakage and directs any such leakage along the interior of the rotor to the drain holes 26.

During the time that leakage liquid is being restored to the cavity 18 through the drain holes 26, other liquid is being discharged under a relatively high pressure into the continuous gap 39. As it enters the gap 39, the liquid is swirling nearly at the peripheral speed of the rotor, and therefore, as more liquid continues to enter the recirculator, the liquid in the recirculator continues to rotate and ultimately be sufficiently full and pressurized to discharge through the radially inwardly directed apertures 38 into the annular axial gap 40. The embodiment of FIG. 3 converts some of the dynamic pressure of the rotating fluid ring into a static pressure.

A centrifugal seal 41 of FIG. 3 is shown in association with an inner race 42 carried on the shaft 13 and an outer race 43 carried on the housing 15. The seal 41 includes a fixed annular cap 44 carried by the housing 15 and having a cylindrical portion 45. A recirculator 46 is also carried on the housing 15 in association with the outer race 43 and abuts the annular cap 44 and with it jointly defines an annular cavity 47 for the sealing liquid. Carried in association with the inner race 42 on the shaft 13 is a rotor 48 composed of an annular cup 49 closed by an annular cover 50. The upper or radially outer ends of the cup 49 and cover 50 are identified by the numerals 20 and 23 to be consistent with FIGS. 2 and 5. First, second, and third annular gaps 51, 52, 53 are respectively bounded or defined by the corresponding components.

In this embodiment, the conducting means comprises two sets of laminations 54, 55. There are three of the laminations 54 whose outer peripheries are guided at the largest internal diameter of the rotor 48, the same being defined by a series of radially directed tabs 56, which are disposed between adjacent pairs of the holes 26. The second set of laminations 55 is peripherally guided also by the interior of the rotor 48, but at a smaller diameter.

Figure 4:
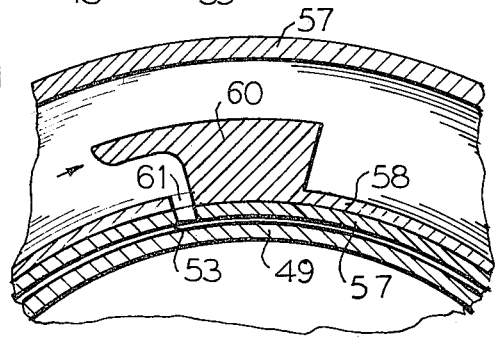
FIG. 4 is a fragmentary cross-sectional view taken along line IV—IV of FIG. 3.

In this embodiment, the recirculator 46 includes an annular cup 57 closed by an annular cap 58 having a continuous gap 59 about its periphery. However, the annular cap 58 is provided with a radially outwardly projecting lip 60. When the liquid is rotating in a clockwise direction as viewed in FIG. 4, it will impinge upon the end surface of the lip 60 and thus convert most of its dynamic head into a static pressure immediately upstream of a pair of aligned apertures 61.

Downstream along the first annular gap 51 but upstream of the annular gap 52, the cylindrical portion 45 of the annular cap 44, beyond a diverting means 62 is provided with a beveled valve or static seal seat 63 which is engaged by a movable valve in the form of an elastomeric O-ring 64 carried within and rotatable with the rotor 48. When there is no rotation, the O-ring 64 engages the seat 63 and thus prevents any leakage in either direction past that point. However, there is a set of weight segments 65 that are secured to the O-ring 64, for example four arcuate weight segments, which as a consequence of rotation have a centrifugal force applied thereto causing the O-ring 64 to grow in diameter until it disengages from the seat 63. Thus, by this feature, a static seal property and function is provided for the centrifugal fluid seal 41, whereby static pressure of the fluid to be sealed does not blow out through the fluid seal in the absence of adequate rotational speed.

While the O-ring 64 is rotatable with the rotor 48, it is preferable to have some type of means for ensuring such corotation. To that end, a number of guides are provided, one of which is shown at 66. Each of the guides 66 extends between an adjacent pair of the weight segments 65. In this embodiment, each guide 66 is provided by a tab which is formed out of the adjacent one of the laminations 55. However, it would be equivalent to have the guides 66 carried by the adjacent inside wall of the rotor. The guides 66 thus assure corotation of the assembly of O-ring 64 and weight segments 65 with the rotor during dynamic seal operation.

The recirculators 17 and 46 may be utilized with other constructions of centrifugal fluid seal.

The presence of a static pressure within the recirculators 17, 46, in part produced by the conversion of dynamic head to static pressure, has the effect of pressurizing the annular gap 40 in FIG. 2 and the annular gap 53 in FIG. 3, thereby increasing the pressure sealing capability of the fluid seal. Of importance is the fact that pressurized liquid enters the recirculator at the outer periphery of the seal and flows radially inwardly; in certain applications it is accompanied by conversion of some dynamic fluid pressure into static pressure due to the diffusing action that the recirculator has on flowing liquid. In the event that cavitation within the recirculator cannot be tolerated, a modification of the form of the radial lip 60 would be necessary. For example, smooth passages defined by vanes or drilled holes may be employed having steadily increasing cross-sectional areas to achieve pressure recovery by diffusor action in the flow between the continuous gaps 39, 59 and the holes 38, 61.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A centrifugal fluid seal for acting between the inner and outer races of a bearing assembly, said seal comprising:
   (a) a hollow rotor having an axial opening engageable with the inner race in fluid-tight relation, said rotor having a number of drain holes extending therethrough near the largest diameter of its hollow interior;
   (b) a fixed annular cap cooperative at its outer periphery with the outer race in fluid-tight relation and defining part of a cavity encircling the periphery of said rotor into which cavity said drain holes open;
   (c) said cap and said rotor jointly defining an annular gap leading from said cavity into the interior of said rotor radially inwardly of said drain holes;
   (d) means carried by said cap and disposed within the interior of said rotor, downstream of said annular gap for diverting fluid from said annular gap toward said drain holes, said diverting means being spaced radially inwardly from any liquid accumulation upstream of said drain holes; and
   (e) a static annular recirculator adapted to be fixed with the outer race and defining part of said cavity, said recirculator being apertured to receive centrifugally pressurized liquid from said drain holes and to discharge such liquid radially inwardly toward said inner race.

2. A centrifugal fluid seal according to claim 1, said rotor comprising an annular cup adapted to provide said fluid-tight relation with the inner race, and an annular cover enclosing the periphery of said annular cup and defining the radially outer surface of said annular gap.

3. A centrifugal fluid seal according to claim 2, said annular cup and said annular cap jointly defining a second annular gap communicating the outside of said annular cap with the interior of said rotor.

4. A centrifugal fluid seal according to claim 3, said diverting means including an annular step within said rotor and having a diameter intermediate those of said annular gaps.

5. A centrifugal fluid seal according to claim 3, said annular cup and said annular cap each having a cylindrical portion jointly defining said second annular gap.

6. A centrifugal seal according to claim 2, said number of drain holes comprising:
   (a) a relatively large number of holes extending radially through said annular cup and closed by said annular cover;
   (b) a groove in the outer periphery of said annular cup facing said annular cover and interconnecting said large number of holes; and
   (c) a relatively small number of blind bores in said rotor connecting said groove with said cavity at said recirculator.

7. A centrifugal fluid seal according to claim 1, including a plurality of axially spaced annular laminations within said rotor and radially positioned by engagement of their outer peripheries with the interior of said rotor, their inner peripheries having a diameter similar to that of said annular gap.

8. A centrifugal seal according to claim 7, said interior of said rotor engaged by said laminations comprising a series of radially inwardly directed tabs disposed respectively between said drain holes.

9. A centrifugal fluid seal according to claim 1, said diverting means including an annular step within said rotor and having a diameter smaller than that of said annular gap.

10. A centrifugal fluid seal according to claim 9, including conducting means within said rotor extending from said step to said drain holes through which fluid may pass in response to centrifugal force.

11. A centrifugal fluid seal according to claim 10, said conducting means being a plurality of axially spaced laminations.

12. A centrifugal fluid seal according to claim 1, including conducting means supported within said rotor and providing surfaces on which fluid may pass, in response to centrifugal force, from said annular gap to said drain holes.

13. A centrifugal fluid seal according to claim 12, said conducting means including axially spaced laminations.

14. A centrifugal fluid seal according to claim 12, said conducting means including unified porous material.

15. A centrifugal fluid seal according to claim 1, said recirculator and said cap being in abutting relationship to each other and thereby jointly defining the axial extent of said cavity.

16. A centrifugal fluid seal according to claim 1, said recirculator comprising an annular cup adapted to be supported at its outer periphery, and an annular cap supported at its inner periphery by said annular cup, the aperture of said recirculator being a continuous gap surrounding said cap at the largest diameter of said cavity.

17. A centrifugal fluid seal according to claim 16, said recirculator cup and said recirculator cap having cylindrical portions press-fitted together, there being aligned fluid discharge openings extending through said cylindrical portions.

18. A centrifugal seal according to claim 1, said recirculator having therein at its smaller diameter a radially outwardly projecting lip with a fluid discharge opening at the upstream side thereof.

19. A centrifugal seal according to claim 1, including:
   (a) an elastomeric O-ring within said rotor sealing a gap between said rotor and said fixed annular cap in the absence of rotor rotation; and
   (b) a number of weights secured to said O-ring and movable radially outwardly in response to centrifugal force produced by rotor rotation to effect disengagement of said O-ring from said annular cap.

20. A centrifugal seal for acting between a rotatable part and a surrounding stationary part, comprising:
(a) a hollow rotor having an axial opening engageable with the rotatable part in fluid-tight relation, said rotor having a number of drain holes extending therethrough near the largest diameter of its hollow interior;
(b) a fixed annular cap cooperative at its outer periphery with the stationary part in fluid-tight relation, and defining part of a cavity encircling the periphery of said rotor into which cavity said drain holes open;
(c) said cap and said rotor jointly defining an annular gap leading from said cavity into the interior of said rotor radially inwardly of said drain holes;
(d) means carried by said cap and disposed within the interior of said rotor, downstream of said annular gap for diverting fluid from said annular gap toward said drain holes, said diverting means being spaced radially inwardly from any liquid accumulation upstream of said drain holes;
(e) an elastomeric O-ring within said rotor sealing a gap between said rotor and said fixed annular cap in the absence of rotor rotation; and
(f) a number of weight segments, secured to said O-ring and movable radially outwardly in response to centrifugal force produced by rotor rotation to effect disengagement of said O-ring from said annular cap.

21. A centrifugal seal according to claim 20, said annular cap having a beveled sealing face engageable by said O-ring.

22. A centrifugal seal according to claim 20, including a number of guides supported for rotation with said rotor, each guide extending into a space between an adjacent pair of weight segments, said guides assuring corotation of the O-ring and weight segments with said rotor.

* * * * *